(12) United States Patent
Runzel et al.

(10) Patent No.: US 10,065,668 B2
(45) Date of Patent: Sep. 4, 2018

(54) CABLE DISPENSING SYSTEM AND APPARATUS

(71) Applicant: Lake Cable, LLC, Bensenville, IL (US)

(72) Inventors: William Runzel, Bensenville, IL (US); Cooper Runzel, Bensenville, IL (US); Emile Tohme, Bensenville, IL (US); Tony Kernagis, Bensenville, IL (US)

(73) Assignee: Lake Cable, LLC, Bensenville, IL (US)

( * ) Notice: Subject to any disclaimer, the term of this patent is extended or adjusted under 35 U.S.C. 154(b) by 250 days.

(21) Appl. No.: 15/160,920

(22) Filed: May 20, 2016

(65) Prior Publication Data

US 2016/0347573 A1    Dec. 1, 2016

Related U.S. Application Data

(60) Provisional application No. 62/168,676, filed on May 29, 2015, provisional application No. 62/195,438, filed on Jul. 22, 2015.

(51) Int. Cl.
*B65H 49/20* (2006.01)
*B62B 5/04* (2006.01)
(Continued)

(52) U.S. Cl.
CPC ............ *B62B 5/0433* (2013.01); *B62B 3/005* (2013.01); *B65H 49/16* (2013.01); *B65H 49/32* (2013.01);
(Continued)

(58) Field of Classification Search
CPC ..... B62B 5/0433; B62B 3/005; B65H 49/205; B65H 57/12; B65H 57/18; B65H 2701/34; B65H 2405/4222; B65H 2601/25
(Continued)

(56) References Cited

U.S. PATENT DOCUMENTS 3,587,840 A    6/1971  Hultberg
3,680,810 A    8/1972  Hultberg
(Continued)

FOREIGN PATENT DOCUMENTS

EP    1564175    6/2012
GB    2031834    4/1980
(Continued)

*Primary Examiner* — Michael R Mansen
*Assistant Examiner* — Mark K Buse
(74) *Attorney, Agent, or Firm* — Neal, Gerber & Eisenberg LLP

(57) ABSTRACT

A hand cart for dispensing wire is provided. The hand cart comprises a cart body extending vertically between a bottom portion and a top portion, and a plurality of wheels connected to the bottom portion of the cart body. The hand cart may support multiple racks, each rack having bins to house wire containers. The racks may have a dispensing cone for directing wire as it is pulled out of the wire containers. The cart is equipped with a brake assembly connected to the bottom portion of the cart body, the brake assembly having an engaged configuration in which the assembly extends to a surface on which the wheels rest and engages the surface to prevent the hand cart from changing location, but allowing it to be pivoted about the brake assembly.

18 Claims, 10 Drawing Sheets

(51) Int. Cl.
*B62B 3/00* (2006.01)
*B65H 57/12* (2006.01)
*B65H 49/16* (2006.01)
*B65H 49/32* (2006.01)
*B65H 57/16* (2006.01)

(52) U.S. Cl.
CPC ............. *B65H 57/12* (2013.01); *B65H 57/16* (2013.01); *B65H 2701/34* (2013.01)

(58) Field of Classification Search
USPC ........................................................ 242/557
See application file for complete search history.

(56) References Cited

U.S. PATENT DOCUMENTS

| | | | |
|---|---|---|---|
| 4,369,881 A | 1/1983 | Ditchfield | |
| 4,431,144 A | 2/1984 | Foster | |
| 4,771,889 A | 9/1988 | Bauer | |
| 5,086,919 A | 2/1992 | Toral et al. | |
| 5,316,232 A * | 5/1994 | Lambert, Jr. | B65H 49/32 242/129 |
| 5,501,325 A | 3/1996 | Mehltretter | |
| 5,509,671 A * | 4/1996 | Campbell | B62B 1/264 242/557 |
| 5,529,186 A | 6/1996 | Bass | |
| 5,642,812 A | 7/1997 | Hale | |
| 5,687,928 A * | 11/1997 | Lassiter | B65H 49/24 242/129.5 |
| 5,732,899 A * | 3/1998 | Wells | B65H 49/32 242/423.1 |
| 6,003,667 A | 12/1999 | Barnett et al. | |
| 6,116,533 A * | 9/2000 | Elder | B65H 49/325 242/557 |
| 6,270,094 B1 * | 8/2001 | Campbell | B62B 3/006 242/594.4 |
| 6,422,504 B1 * | 7/2002 | Elder | B65H 49/32 211/85.5 |
| 6,523,776 B1 * | 2/2003 | Elder | B65H 49/32 211/85.5 |
| 6,698,682 B1 * | 3/2004 | Roderick | B65H 49/321 242/557 |
| 6,834,827 B2 * | 12/2004 | Burkitt | B65H 49/32 242/557 |
| 7,204,452 B2 | 4/2007 | Wilkinson | |
| 7,204,509 B1 * | 4/2007 | Vanderminden | A47B 31/00 280/47.12 |
| 7,243,876 B2 * | 7/2007 | Robison | B65H 49/32 242/557 |
| 7,320,445 B2 * | 1/2008 | Eastwood | B65H 49/322 242/588.6 |
| 7,784,729 B1 * | 8/2010 | Hope | B65H 49/32 242/557 |
| 7,931,227 B1 * | 4/2011 | Oudekerk | B65H 49/32 242/403.1 |
| 7,976,031 B2 * | 7/2011 | Duarte | B62B 3/10 280/35 |
| 8,016,222 B2 * | 9/2011 | Galgano | B62B 1/14 242/403 |
| 8,099,815 B2 * | 1/2012 | Kostigian | A47F 7/175 15/268 |
| 8,136,753 B2 | 3/2012 | Galgano et al. | |
| 8,322,690 B2 * | 12/2012 | Cathlina | B65B 27/10 254/134.3 FT |
| 8,387,099 B2 | 2/2013 | Perlman et al. | |
| 8,459,585 B1 * | 6/2013 | Elder | B65H 49/32 242/403 |
| 8,474,744 B2 * | 7/2013 | Jacquart | A47F 7/17 242/557 |
| 8,887,033 B1 | 11/2014 | Varnica et al. | |
| 9,370,969 B2 * | 6/2016 | Kroening | B60B 33/0002 |
| D800,406 S * | 10/2017 | Runzel | D34/14 |
| D800,407 S * | 10/2017 | Runzel | D34/14 |
| 9,884,738 B1 * | 2/2018 | Arce | B65H 75/40 |
| 2001/0030257 A1 * | 10/2001 | Fletcher | B65H 57/16 242/557 |
| 2001/0030258 A1 * | 10/2001 | Lenski | B65H 49/32 242/563.2 |
| 2002/0063184 A1 * | 5/2002 | Walker | B65H 19/126 242/557 |
| 2003/0122027 A1 * | 7/2003 | Bootsman | B65H 49/322 242/557 |
| 2005/0285361 A1 * | 12/2005 | Gregory | B62B 3/106 280/47.35 |
| 2006/0038053 A1 * | 2/2006 | Giovannoni | B65H 49/321 242/557 |
| 2006/0096047 A1 * | 5/2006 | Kostigian | A47F 7/175 15/40 |
| 2007/0120003 A1 * | 5/2007 | Grant | B65H 49/24 242/557 |
| 2007/0295847 A1 | 12/2007 | Weck et al. | |
| 2008/0048063 A1 * | 2/2008 | Wells | B65H 49/32 242/557 |
| 2008/0135669 A1 * | 6/2008 | Kostigian | A47F 7/175 242/557 |
| 2012/0048988 A1 * | 3/2012 | Pulver | B65H 49/32 242/557 |
| 2012/0312390 A1 * | 12/2012 | Olson | A47L 11/4075 137/234.6 |
| 2012/0318939 A1 * | 12/2012 | Galgano | B65D 85/04 248/127 |
| 2013/0026120 A1 * | 1/2013 | Johnson | A47B 55/02 211/85.5 |
| 2014/0326625 A1 | 11/2014 | Copp et al. | |

FOREIGN PATENT DOCUMENTS

| | | |
|---|---|---|
| WO | 2000/044661 | 8/2000 |
| WO | 2002/085753 | 10/2002 |

\* cited by examiner

CABLE DISPENSING SYSTEM AND APPARATUS

CROSS-REFERENCE TO RELATED APPLICATIONS

This non-provisional patent application claims priority to U.S. Provisional Patent App. No. 62/168,676 filed on May 29, 2015 and 62/195,438 filed on Jul. 22, 2015. These provisional applications are incorporated herein by reference in their entirety.

TECHNICAL FIELD

The present invention relates to utility equipment used in the commercial electrician trades, and more particularly to equipment used to assist in storing, transporting and dispensing wire or cable products.

BACKGROUND

Large electrical installation jobs often requiring running wire or cable long distances through narrow or overhead passageways. The products being installed range broadly from common, solid or stranded copper electrical wire, speaker wires, coaxial cable, or complicated, multi-functional and braided cables that may transfer multiple types of signals or power. While some of these may be referred to as wires vs. cables, for simplicity the term wire will be used to reference all such varieties herein. Wire is typically installed through long pieces of conduit requiring it to be inserted through and then pulled along from the far end, which may be many dozens of feet away, around a corner, etc. Accordingly, it is necessary for the source of the wire (typically a spool of some sort) to remain fixed at a first location while the wire is paid out by being pulled from a second location. Once these distances get too far apart, tension builds and it becomes difficult to pull wire. Eventually, the installer must stop, install a junction box or the like, reposition the wire source, and start fresh.

Changes in direction (such as around corners, up or down walls, or around objects) in the path of the wire being installed increases the tension on the lines as it is being pulled through and drastically shortens the distance that an installer can work from the wire source. Thus, a good installer will design the routing to reduce the number of directional changes where possible. One directional change that is ideally avoidable is an immediate one from the payout source. Thus, it is desirable for the wire source to pay out in the direction the installer is working, adding as little tension to the line as possible. It is also obviously desirable for the wire source to stay put. If it moves when the wire is pulled, it can quickly get into a configuration where there is added tension from the wire source, or can lead to other calamities.

Wire traditionally comes wound on hollow spools between two round hubs. The spool and hubs form a reel that must be fixed in some manner to avoid rolling. A rod may be inserted through the spool around which the reel rotates to dispense the wire. However, this adds to installation time when the reels must be placed on and removed from the rod and whatever mechanism is holding it in place. There is also often a need to install multiple gauges or types of wire at once, which may be limited by the number of fixed rod stands available. Another option is for the reel to be placed in a dispensing box (typically cardboard or the like), such as shown in U.S. Pub. 2007/0295847 to Weck. This allows the wire to be stacked and transported efficiently, and prevents it from rolling. But the boxes can still scoot along a floor surface when the wire is pulled out if the box is not mounted in place.

Some wire dispensing systems have been designed specifically for cable or wire wound on reels and placed inside a carton or box. For example, U.S. Pat. No. 8,387,099 to Galgano describes a manual transporter or cart with axial inserts for insertion into entry holes of a wire reel, thereby axially coupling the central rod to the cart. While such a cart can accommodate several boxes of wire, it can only accommodate such boxes specifically sized to fit on the cart. When one box is exhausted, installation may need to halt because several boxes may need to be removed from the central mounting rod to allow a new box to be mounted. Also, as discussed further below, wire is now coming packaged in new varieties that cannot be accommodated by such a cart because there is no central hole or spool for mounting. Furthermore, the wire pays out in the Galgano cart only in the direction where the holes are cut in the boxes based on way the cart is facing.

Using such prior art systems, if an installer needs to change direction and install down a different hallway, for example, the cart must be manually turned. If two installers are working in opposite directions simultaneously, the wire will be tensing against the box in at least one of those directions at the payout source. Finally, where boxes are stacked on top of each other, the wire may have to be routed through several other boxes in order to break free of the cart assembly. All of this adds the chance for friction and tension to build in the line, reducing the operating distance and efficiency of the dispensing system. Accordingly, there is a need for a wire dispensing cart that helps reduce line tension and increase working distance, does not require constant repositioning, and can accommodate cable bags and the like.

SUMMARY OF THE INVENTION

Embodiments of the present invention include a hand cart for dispensing wire comprising a cart body extending vertically between a bottom portion and a top portion. The hand cart includes a plurality of wheels connected to the bottom portion of the cart body, where each wheel may have a rotatable caster. The hand cart also includes at least a first rack supported by the cart body, the rack configured to house a plurality of wire containers. In addition, the hand cart includes a dispensing cone for directing wire and avoiding the buildup of line tension as it is pulled out of the wire containers. Moreover, the hand cart includes a brake assembly connected to the bottom portion of the cart body, the brake assembly having an engaged configuration in which the assembly extends to a surface on which the wheels rest and engages the surface to prevent the hand cart from changing location, but allowing it to be pivoted about the brake assembly so as to orient the cart in the direction of pull from installation.

While certain features and embodiments are referenced above, these and other features and embodiments of the present invention will be, or will become, apparent to one having ordinary skill in the art upon examination of the following figures and detailed description. It is intended that all such additional embodiments and features included within this description, be within the scope of the present invention, and be protected by the accompanying claims.

BRIEF DESCRIPTION OF THE DRAWINGS

The present invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1A:
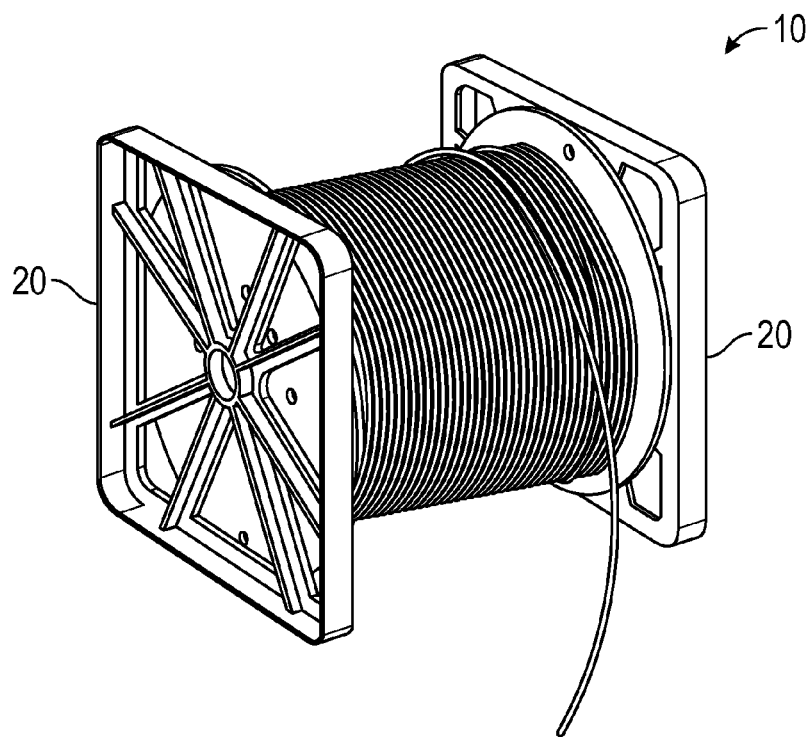
FIG. 1A shows a prior art wire dispensing reel of the traditional type.
Figure 1B:
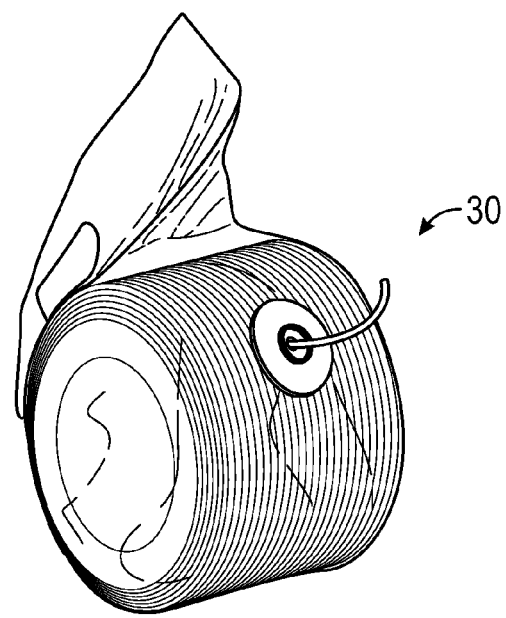
FIG. 1B shows a prior art wire dispensing bag of a newer type now coming on to the market.

FIG. 1A shows a wire reel assembly 10 of the traditional type discussed in the background section above. This reel may be mounted between square side panels 20, which are shaped to fit into a dispensing box with a fixed, directional payout hole (not shown). The reel rotates relative to the box, allowing the wire (coiled from the inside of the spool outward) to dispense. FIG. 1B shows a newer and alternate packaging for wire, in what is referred to herein as a cable bag 30. An example of a cable bag is M8 ProFlex cable bags from REELEX. Cable bags are designed to house up to 75 pounds of wire in each bag without use of a reel or spool. Wound with a special machine, the wire is pulled from the inside or center of the spool to the outside instead of vice versa with the traditional reel. To facilitate this, the cable bag includes an internal guide tube (not shown) that allows for smooth, tangle-free pulls from the center of the bag. The ProFlex packaging for these cable bags provides a flexible shrink-wrap package that is more versatile and produces less waste than traditional cable reel/box configurations, is more compact, reduces weight, and reduces line pull force by eliminating the need to rotate the often heavy reels about an axis, which inevitably leads to additional tension. Further explanation of how these cable bags dispense without rotation is set forth in U.S. Pub. No. 2014/0326625, which is incorporated herein by reference for explanation purposes only.

One limitation of the newer cable bags is that they do not provide a central hole for mounting. Thus, some other mechanism (such as a cage) must be used to hold them in place as they pay out longer distances. Notably, the Galgano prior art wire dispensing hand cart discussed above, and others like it that require a central hole for mounting on a rod, cannot accommodate these new wire containers. As discussed below, the present invention overcomes this limitation and can simultaneously facilitate both the newer cable bags and the traditional reel-in-box systems.

Figure 10:
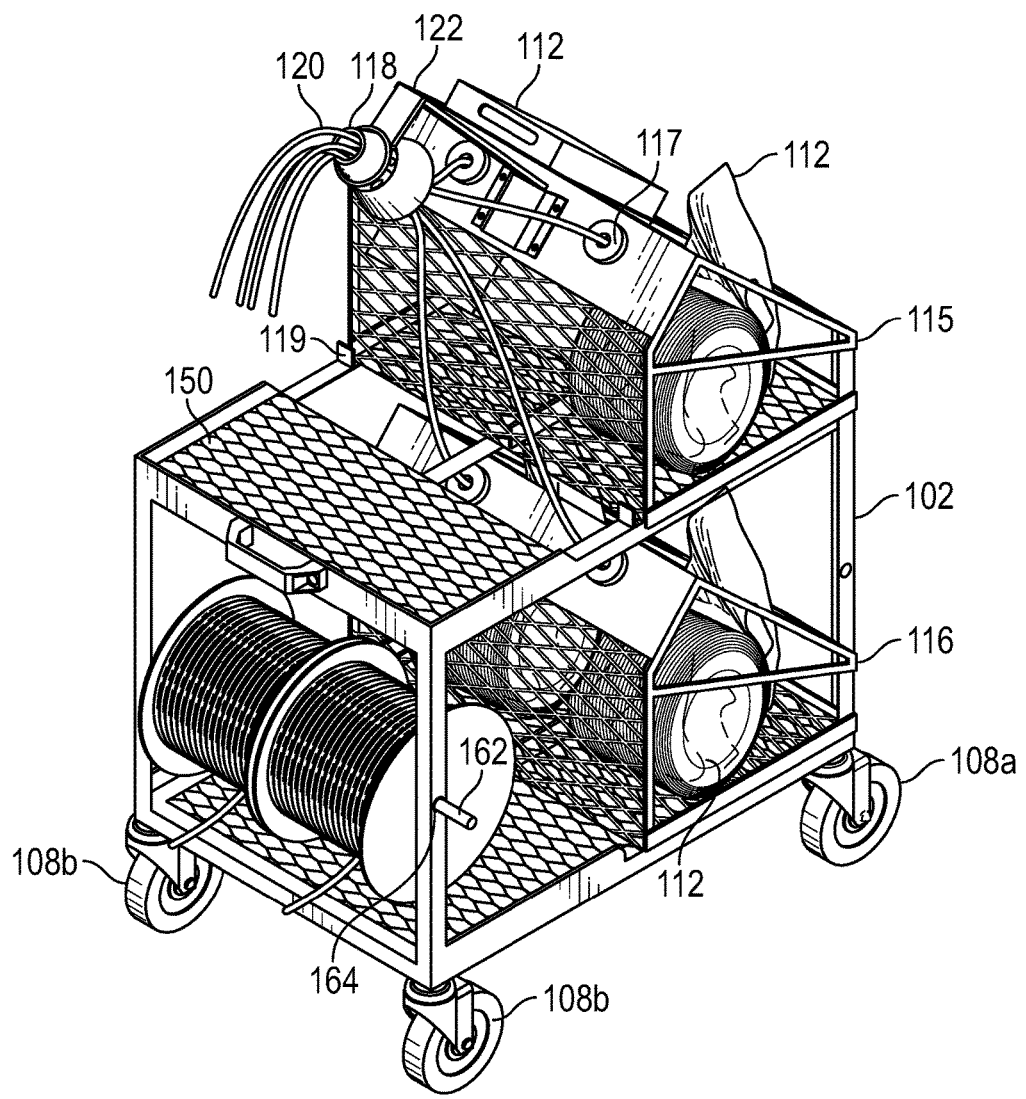
FIG. 10 is an elevated isometric view of an embodiment of the invention showing the invention in a particular configuration in loaded state.

FIGS. 2-6 illustrate an example hand cart assembly 100 (also referred to herein as a "hand cart") for dispensing wire in accordance with embodiments. The hand cart assembly 100 comprises a cart body 102 extending vertically between a bottom portion 104 and a top portion 106. As shown, the hand cart assembly 100 further includes a plurality of wheels 108 connected to the bottom portion 104 of the cart body 102, wherein each wheel 108 may have a rotatable caster. As also shown, the hand cart assembly 100 further includes at least a first rack 110 supported by the cart body 102, the rack 110 configured to house a plurality of wire containers 112. The wire containers can be, for example, M8 cable bags or the traditional reel-in-box variety, as shown in FIG. 10 where each type of container is simultaneously loaded on the top rack 110. Returning to FIG. 2, the first rack 110 can include a plurality of bins or cages 114, and each bin 114 can be configured to house a single wire container 112. The racks 110 may comprise at least four separate bins 114, each capable of housing a separate wire container 112.

As shown, the present invention can accommodate racks 110 having two bins 114 (FIG. 9) or four bins 114 (FIG. 5), but it will be understood that racks having other bin quantities could also be substituted in alternative configurations. As shown best in FIG. 5, the bins are sufficiently open to allow easy placement of the wire containers 112 into the bins, but sufficiently encompass the containers 112 to hold them in place as wire is being paid out. Each bin comprises a payout slot 117 through which wire is fed and directed to a dispensing cone 118 discussed below. Both the payout slot 117 and the dispensing cone 118 are preferably made of a low friction plastic that may be provided with a permanent friction reducing coating since these are the surfaces of the cart that will be in contact with the wire.

Figure 3:
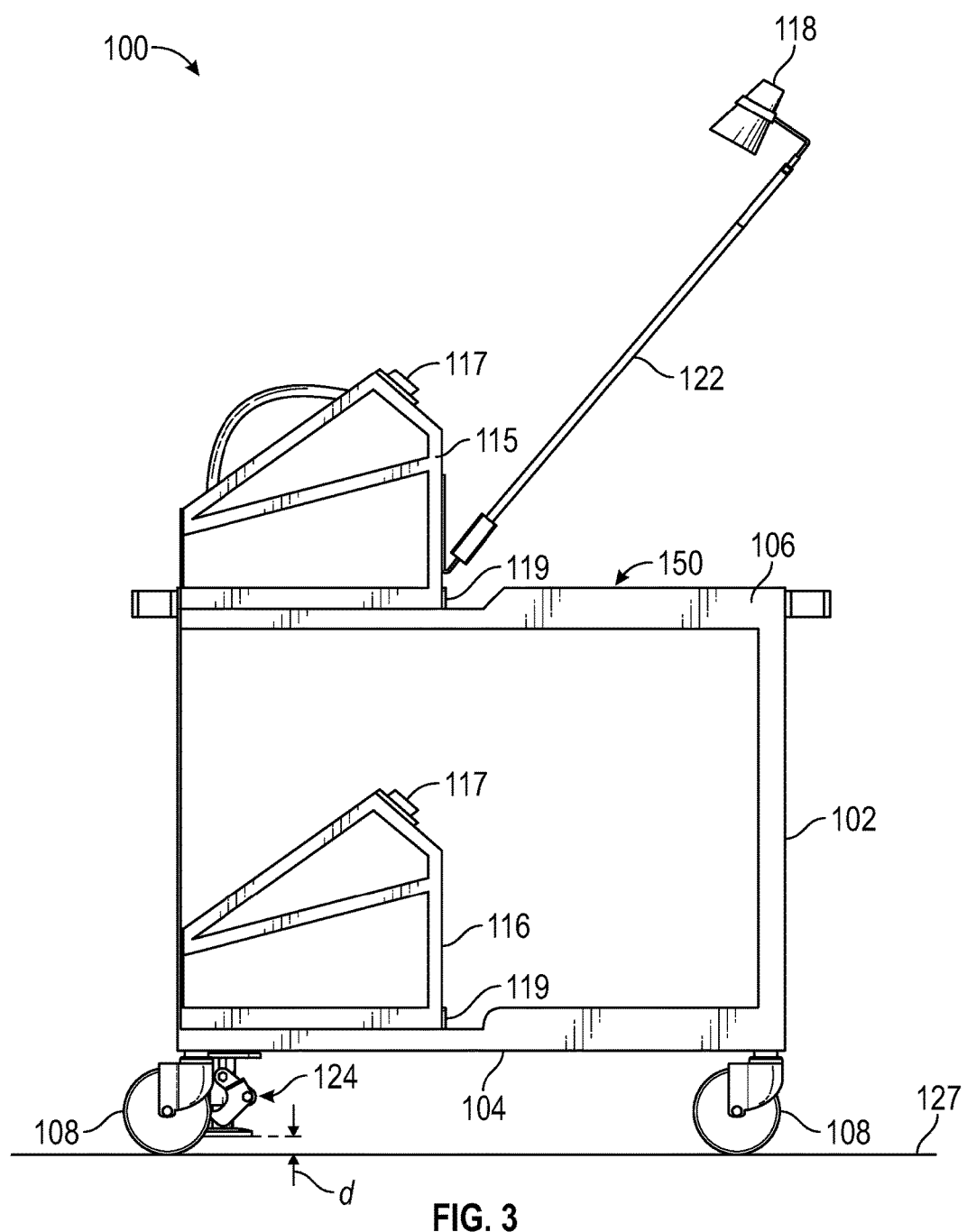
FIG. 3 is a side view of the hand cart assembly shown in FIG. 1 in accordance with embodiments of the present invention.
Figure 5:
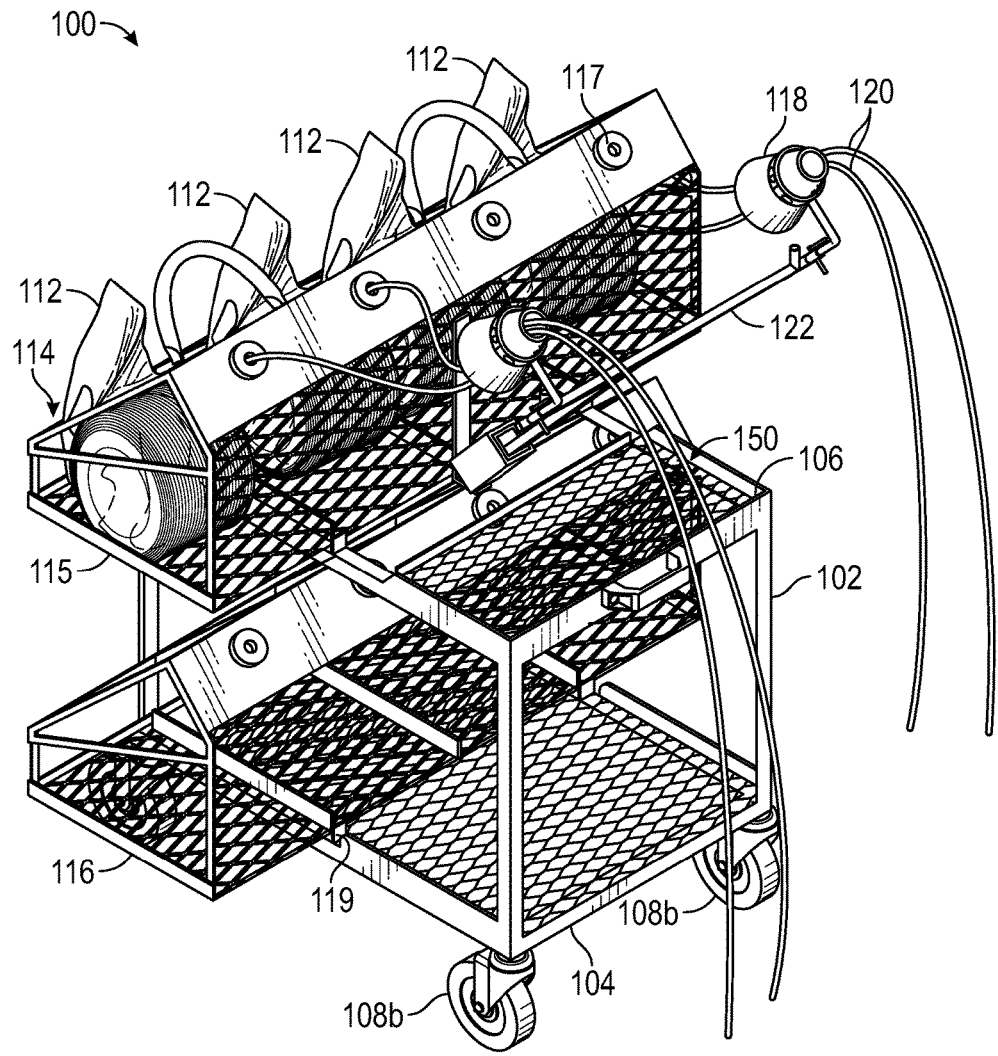
FIG. 5 is an isometric view of the front of the hand cart assembly shown in FIG. 1 with cable bags placed on a top rack of the hand cart in accordance with embodiments of the present invention.
Figure 6:
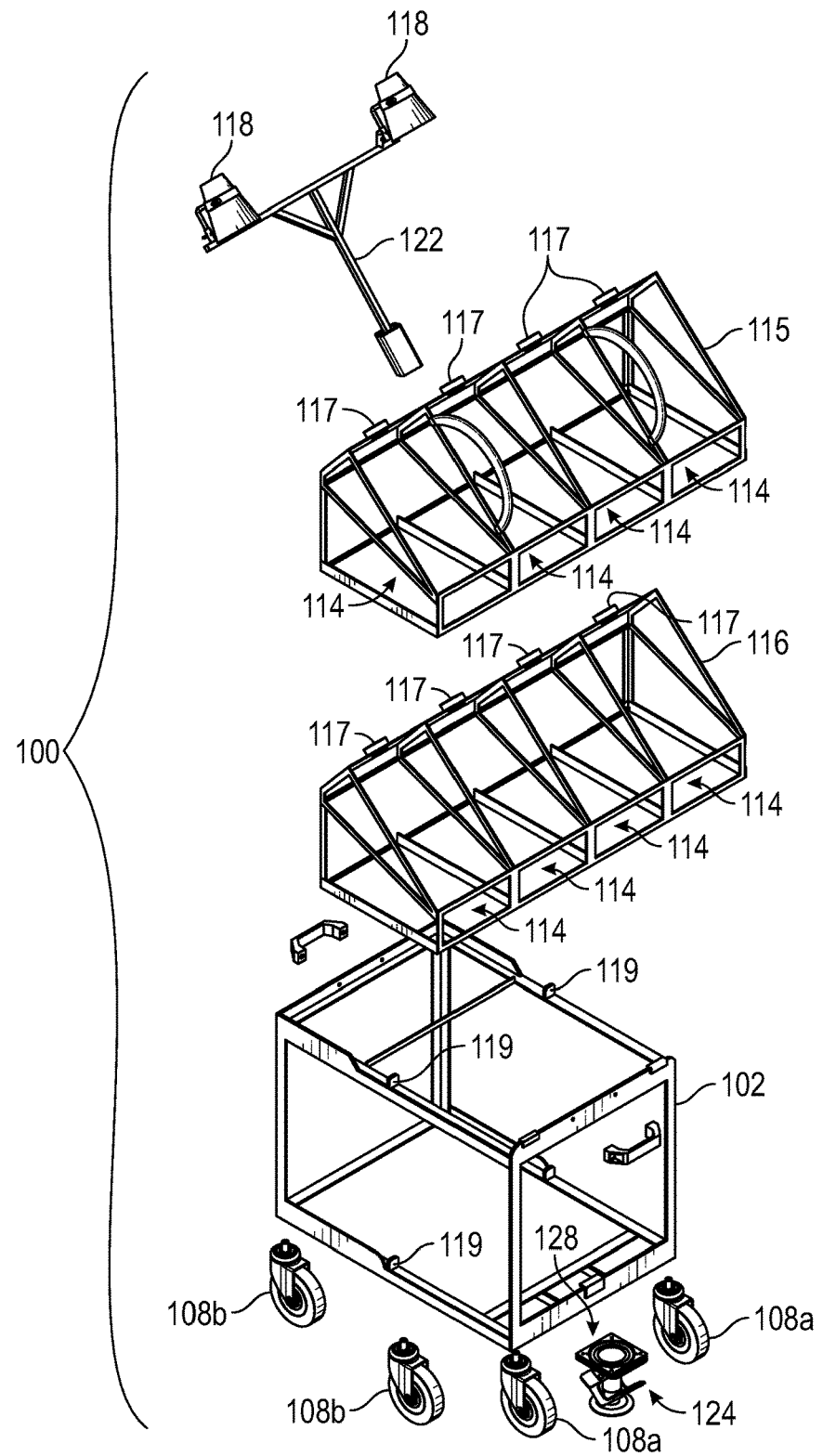
FIG. 6 is an exploded view of the hand cart assembly shown in FIG. 1 in accordance with embodiments of the present invention.

In some embodiments, the hand cart assembly 100 includes at least two racks for housing cable containers 112. For example, as shown in FIG. 3, the hard cart assembly 100 can include a first or upper rack 115 supported on the top portion 106 of the cart body 102 and a second or lower rack 116 positioned between the top portion 106 and the bottom portion 104 of the cart body 102. As shown in FIG. 5, the hand cart assembly 100 can accommodate up to eight wire containers 112 at once, with four containers 112 in the upper rack 115 and four containers 112 in the lower rack 116. Whether using cable bags or traditional boxes, the containers 112 can be easily removed from the racks 110 and replaced without the need to detach or re-attach the container to the cart 100 itself, such as via a mounting rod as used in the prior art. In some embodiments, the racks 115, 116 can be detached from the cart body 102 and carried to a worksite independently of the cart assembly 100, moved to an opposite portion 104/106 of the cart body 102, turned around on the cart body 102 to face an opposite direction, and/or placed in any other modular configuration, increasing the versatility of the hand cart assembly 100.

Figure 9:
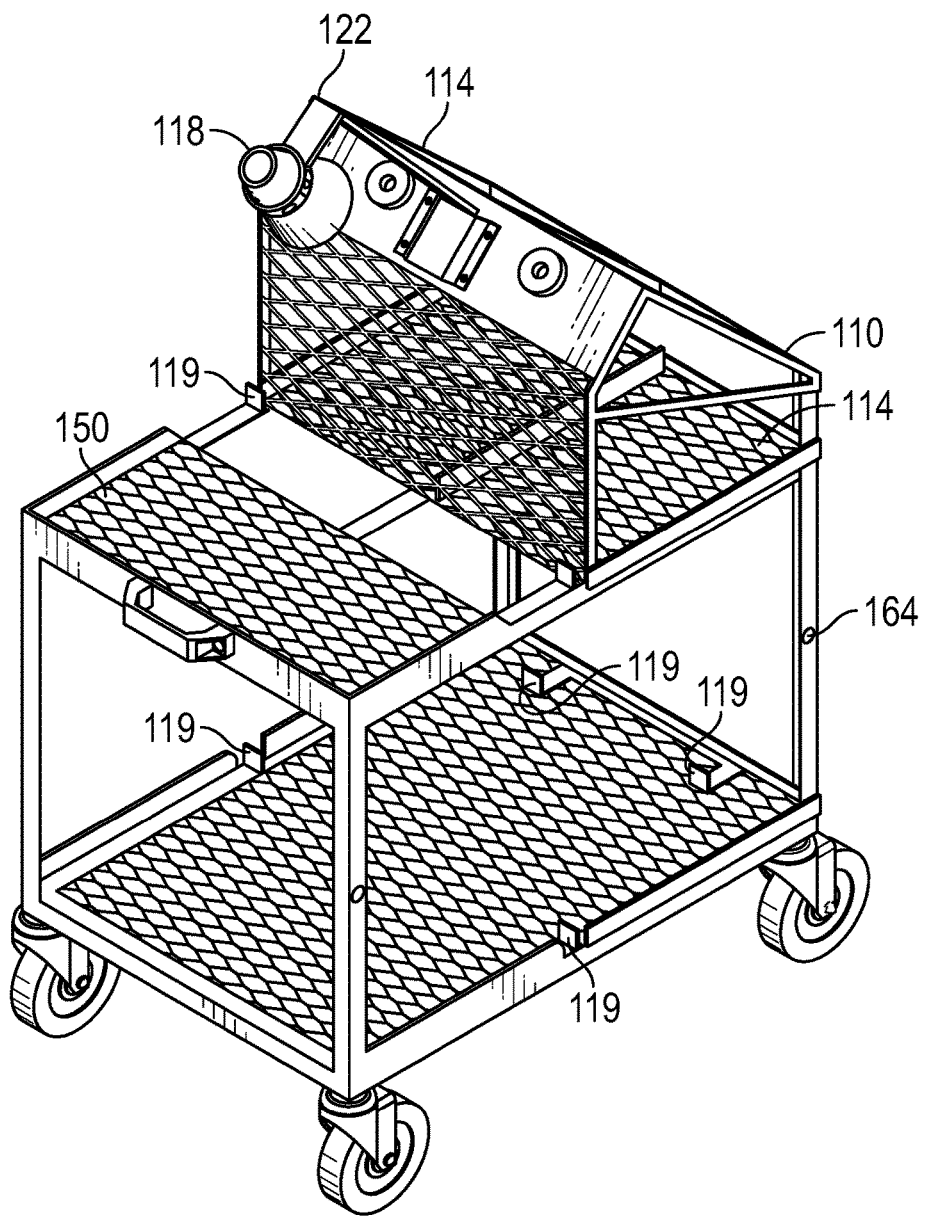
FIG. 9 is an elevated isometric view of an embodiment of the invention showing the invention in a particular configuration in an unloaded state.

As shown perhaps best in FIG. 9, the racks 110 are mounted on the cart between front and rear mounting tabs 119. The tabs 119 are fixed to the cart at a standard distance to accommodate the racks 110. In the illustrated embodiment, the front tabs insert up through a wire mesh that forms the base of the racks 110, while the rear tabs provide a backstop for the racks. Thus, the racks 110 can be installed facing forward or backward, but will not scoot or move relative to the cart. The weight of the wire containers 112 placed in the racks 110 is sufficient to hold them down against the cart 100, but additional securing clips could be used if desired to fix the racks vertically.

In addition, the hand cart assembly 100 includes a dispensing cone 118 for directing wire 120 as it is pulled out of the wire containers 112, as shown in FIG. 5. The dispensing cone 118 can be convex in shape, with a wider opening for receiving the wire 120 and a narrower opening for emitting the wire 120 to help direct it. The dispensing cone 118 is designed to prevent 90 degree pulling of the wires or cables 120, which can cause undesirable wear and tear of the wires or cables 120 and higher friction in the system. The cone 118 also prevents snags or tangles during pulling of the wires or cables 120. In some embodiments, the hand cart assembly 100 includes at least two dispensing cones 118 positioned above the cart body 102 and extending out from a top rack 115 of the hand cart assembly 100.

The hand cart assembly 100 can further comprise a stanchion 122 for supporting the dispensing cone(s) 118. In some embodiments, the stanchion 122 that hold the cones 118 can be adjustable in height, angle, and/or length, to allow further customization of the hand cart assembly 100 to meet the operator's needs. The dispensing cones 118 can be spaced apart from each other to allow cables 120 from up to four different cable bags 112 to be directed through each cone 118. For example, the dispensing cone 118 can direct wire 120 from two containers 112 on the top rack 115 and two containers (not shown) on the bottom rack 116, such as shown in FIG. 10. FIG. 10 illustrates a configuration where 2-bin racks 110 have been loaded onto both the top and bottom of the cart 100. The upper two-bin rack 115 has an alternate stanchion that positions a single dispensing cone 118 in place to handle dispensing from the four wire containers 112 as shown.

Figure 7:
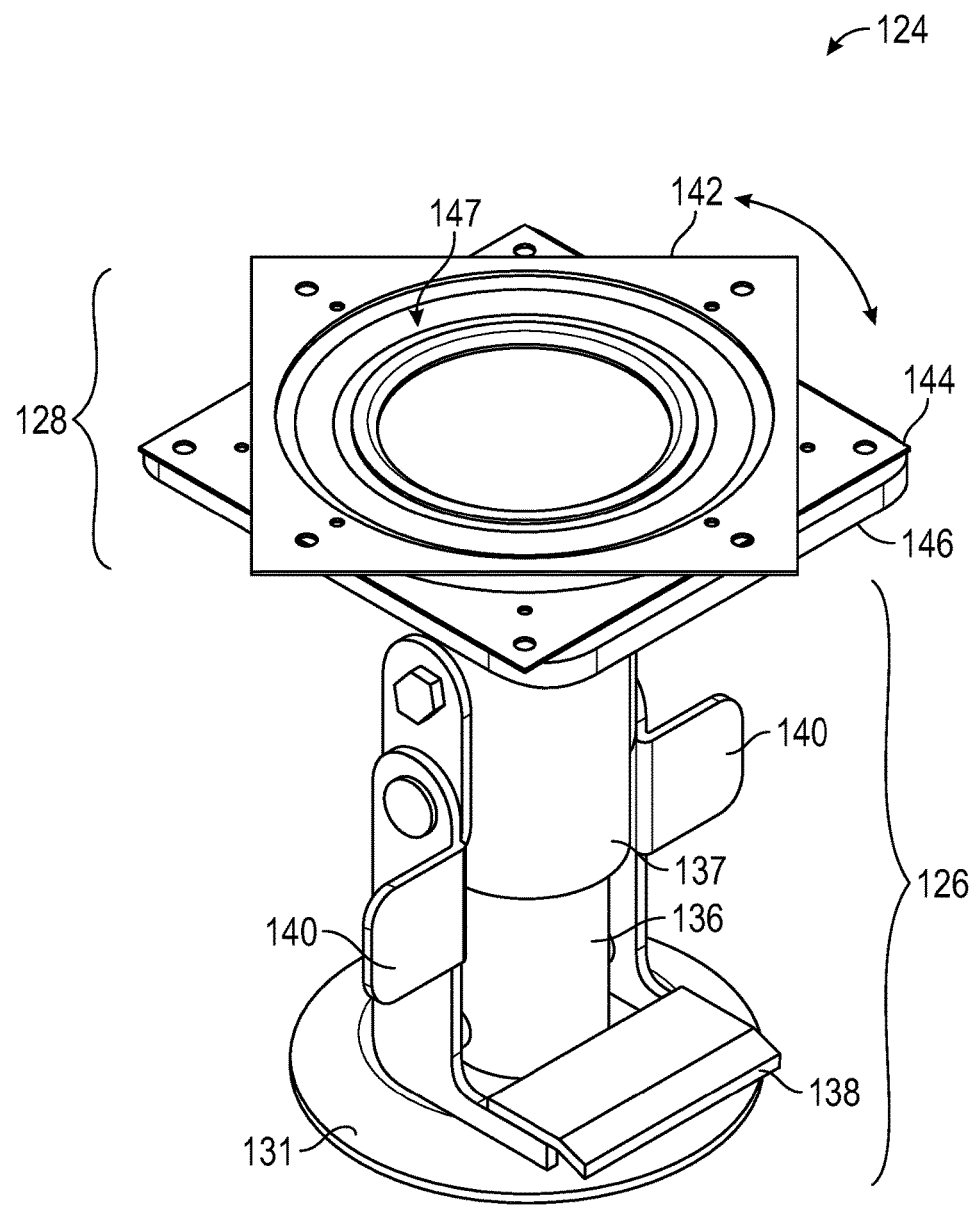
FIG. 7 is a front view of a brake pedal of the hand cart assembly shown in FIG. 3 in accordance with embodiments of the present invention.
Figure 8:
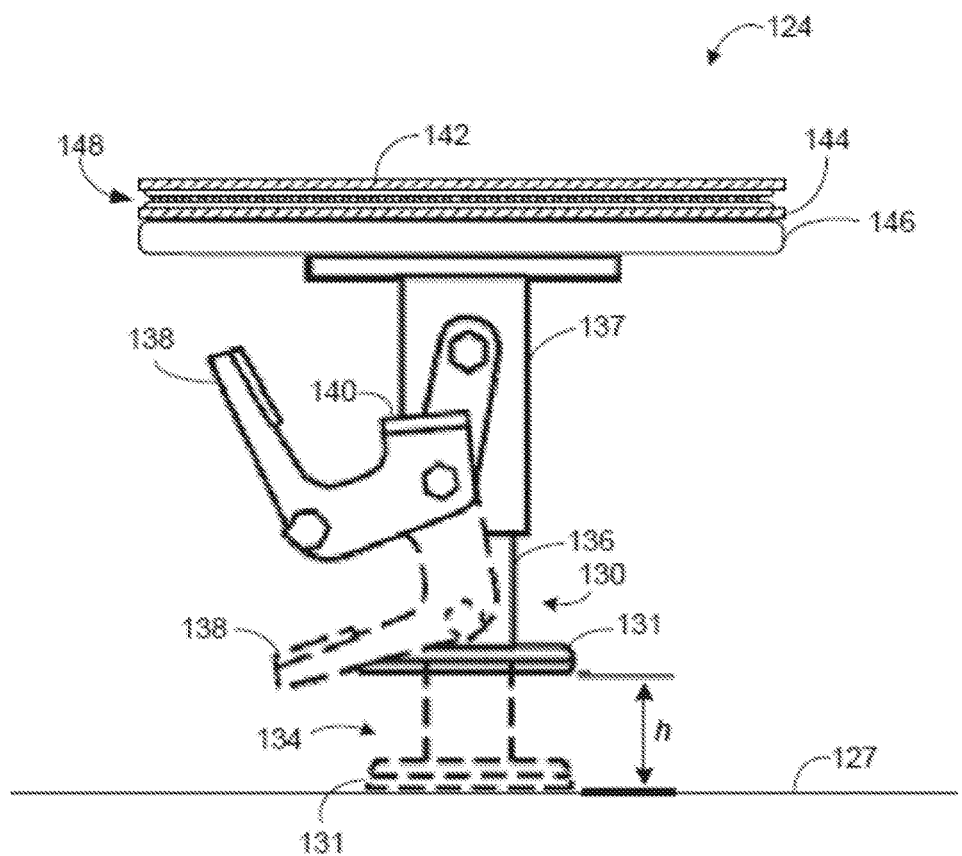
FIG. 8 is a side view of the brake pedal shown in FIG. 7 in accordance with embodiments of the present invention.

In embodiments, the hand cart assembly 100 also includes a brake assembly 124 connected to the bottom portion 104 of the cart body 102, as shown in more detail in FIGS. 7 and 8. The brake assembly 124 allows the hand cart assembly 100 to be pivoted 360 degrees about the point of braking, so that the hand cart assembly 100 need not be re-positioned while in the middle of an installation. For example, the brake assembly 124 may include a heavy-duty swivel brake that allows the hand cart assembly 100 to turn in the direction of a pull and, if that direction changes, swivel the cart 100 around to follow the pull. This ability to swivel also relieves any stress on the dispensing cones 118 as the cables 120 are pulled in different directions.

For example, as shown in FIG. 7, the brake assembly 124 includes a brake portion 126 (also referred to herein as a "retractable brake") for engaging a surface 127 (e.g., a floor) on which the wheels 108a rest to prevent the hand cart assembly 100 from rolling along the surface 127. The brake assembly 124 also includes a swivel portion 128 (also referred to herein as a "swivel plate") for allowing the hard cart assembly 100 to be pivoted about the point at which the braking portion 124 engages the surface 127 (e.g., the "braking point"). As will be appreciated, when the wire 120 from one of the containers 112 is pulled through the dispensing cone 118 in a first direction, this pulling action may naturally cause the hand cart assembly 100 to be pulled towards the first direction as well. Engaging the braking portion 126 prevents the hand cart assembly 100 from rolling away during such pulling action, while the swivel portion 128 allows the hand cart assembly 100 to be rotated towards the direction of pull, for example, so that the cones 118 are angled towards, or facing, the direction in which the cable 120 is being dispensed. In this manner, the hand cart assembly 100 can decrease friction against the dispensing cone 118 as the cable 120 is being distributed therethrough, thereby extending the life of the cones 118, preventing damage to the cable 120, and reducing the tension required by an operator to pull the wire 120 out of the containers 112.

The mechanics and operation of the brake assembly 124 will now be described in more detail. As shown in FIG. 8, the brake portion 126 has a disengaged configuration 130 in which a base 131 of the brake assembly 124 hovers above the surface 127. The brake portion 126 also has an engaged configuration 134 in which the base 131 extends towards and engages the surface 127. In embodiments, the brake portion 126 includes a telescoping pole 136 coupled to the base 131 for enabling movement of the brake portion 126 between the disengaged configuration 130 and the engaged configuration 134. The brake portion 126 also includes a foot pedal 138 for allowing the operator to control operation of the brake portion 126. In embodiments, the foot pedal 138 can be rotatably coupled to the telescoping pole 136, for example, at a hinge (not shown), and operation of the foot pedal 138 can cause the telescoping pole 136 to move in and out of a sleeve 137 of the brake portion 126, as shown in FIG. 8.

For example, pressing the foot pedal 138 downwards can cause the telescoping pole 136 to extend further out of the sleeve 137 and towards the surface 127, until the base 131 engages the surface 127, as represented in FIG. 8 by the foot pedal 138 and base 131 drawn in phantom lines. Lifting the foot pedal 138 upwards can cause the telescoping pool 136 to retract at least partially into the sleeve 137 and lift the base 131 off of the surface 127, thereby disengaging the brake portion 126, as represented in FIG. 8 by the foot pedal 138 and base 131 drawn in solid lines. As shown in FIG. 7, the brake portion 126 can further include one or more release pedals 140 coupled to the foot pedal 138 for facilitating disengagement of the brake portion 126. For example, when the foot pedal 138 is lowered into the engaged configuration 134, as shown in FIG. 7, the brake portion 126 may be disengaged by the operator pressing back on at least one of the release pedals 140. In some cases, the brake portion 126 may also, or alternatively, be disengaged when the operator lifts up on the foot pedal 138.

Figure 2:
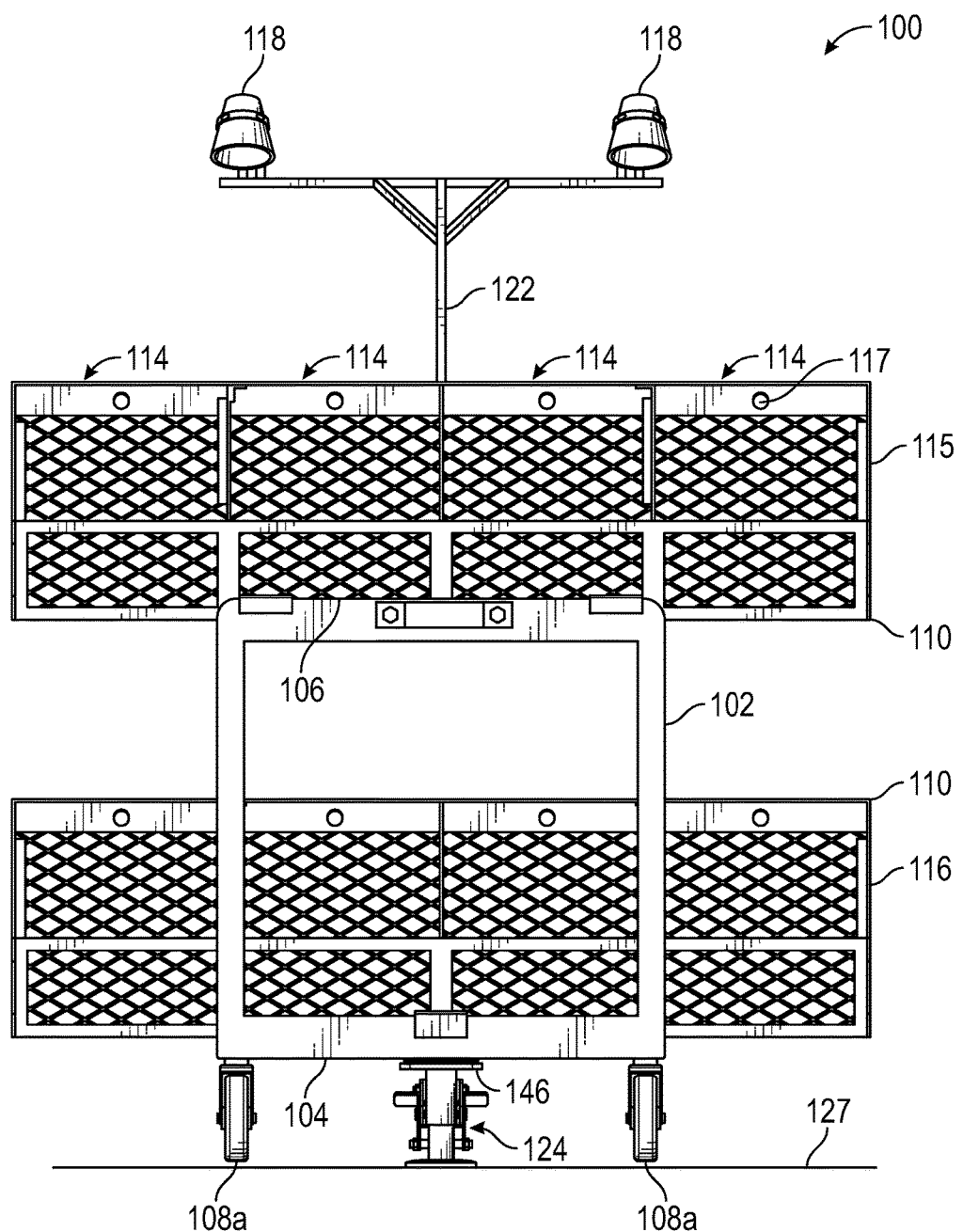
FIG. 2 is a back view of an example hand cart assembly in accordance with embodiments of the present invention.

Preferably, the brake assembly 124 is positioned between an adjacent pair of the wheels 108, such as, for example, rear wheels 108a, as shown in FIG. 2. This allows only these rear wheels to disengage with the floor when the brake assembly 124 is engaged, but the front wheels 108b will still provide floor mounting points allowing for wheeled rotation of the cart 100 about the engaged brake assembly 124. For example, when the brake assembly 124 is in the disengaged configuration 130, all four wheels 108 may rest on the surface 127, but the base 131 of the braking portion 126 may hover a predetermined distance d above the surface 127. This is illustrated best in FIG. 3 where the brake assembly 124 is disengaged as compared to FIG. 2 where it is engaged with surface 127. That is, the predetermined distance d may be the difference in height between a bottom of the wheels 108 and a bottom of the base 131 when the brake assembly 124 is in the disengaged configuration 130. This difference in height can be configured so that the adjacent pair of wheels 108 are lifted off of the surface 127 when the brake assembly 124 is in the engaged configuration 134 (see, e.g., FIG. 2), thereby preventing at least lateral movement of the hand cart assembly 100, but the remaining two wheels 108 (e.g., front wheels 108b) continue to rest on the surface 127 to facilitate rotation of the hand cart assembly 100 about the braking point.

For example, as shown in FIG. 8, the brake portion 126 extends a distance h to reach the surface 127 in the engaged configuration 134. The predetermined distance d can be selected to be less than the distance h, so that extending the brake portion 126 by the distance h causes the rear wheels 108a to be at least slightly lifted off of the surface 127. As an example, the predetermined distance d can be selected by adjusting a height of the wheels 108 and/or by selecting a brake assembly 124 that is shorter in height than the wheels 108.

In embodiments, during the engaged configuration 134 of the brake assembly 124, the front wheels 108b remain on the surface 127 and are free to move or rotate along the surface 127, but only about the point at which the brake assembly 124 engages the surface 127 and as allowed by the swivel portion 128. As shown in FIG. 7, in some embodiments, the swivel portion 128 includes a top plate 142 rotatably coupled to a bottom plate 144. The swivel portion 128 also includes a turntable bearing between top plate 142 and bottom plate 144 to allow the cart body 102 to spin up to 360 degrees about the point at which the braking portion 126 engages the surface 127. As an example, FIG. 7 shows the swivel portion 128 in a partially rotated position, and FIG. 8 shows the swivel portion 128 in a rest position. Each of the plates 142, 144 can include one or more rings 147 (also referred to as a "circular race") that house a plurality of ball bearings 148 for enable rotation of the top plate 142 relative to the bottom plate 144. The bottom plate 144 can be fixedly coupled to a face plate 146 on top of the brake portion 126, and the top plate 142 can be fixedly coupled to the bottom portion 104 of the cart body 102, for example, between the rear wheels 108a, as shown in FIG. 2. As will be appreciated, in other embodiments, the top plate 142 may be rotatably coupled to the bottom plate 144 using any other suitable means, and/or the swivel portion 128 may include other suitable means for allowing the cart body 102 to swivel about the braking portion 126.

Configuring the adjacent rear wheels 108a to hover above the surface 127 during the engaged configuration 134 of the brake assembly 124 allows the hand cart assembly 100 to smoothly and easily swivel about the braking point using the swivel portion 128. In other embodiments, the rear wheels 108a may remain on the surface 127 during the engaged configuration 134 of the brake assembly 124. In such cases, the hand cart assembly 100 may still swivel about the braking point using the swivel portion 128, but with at least slightly greater resistance (e.g., from the rear wheels 108a).

Figure 4:
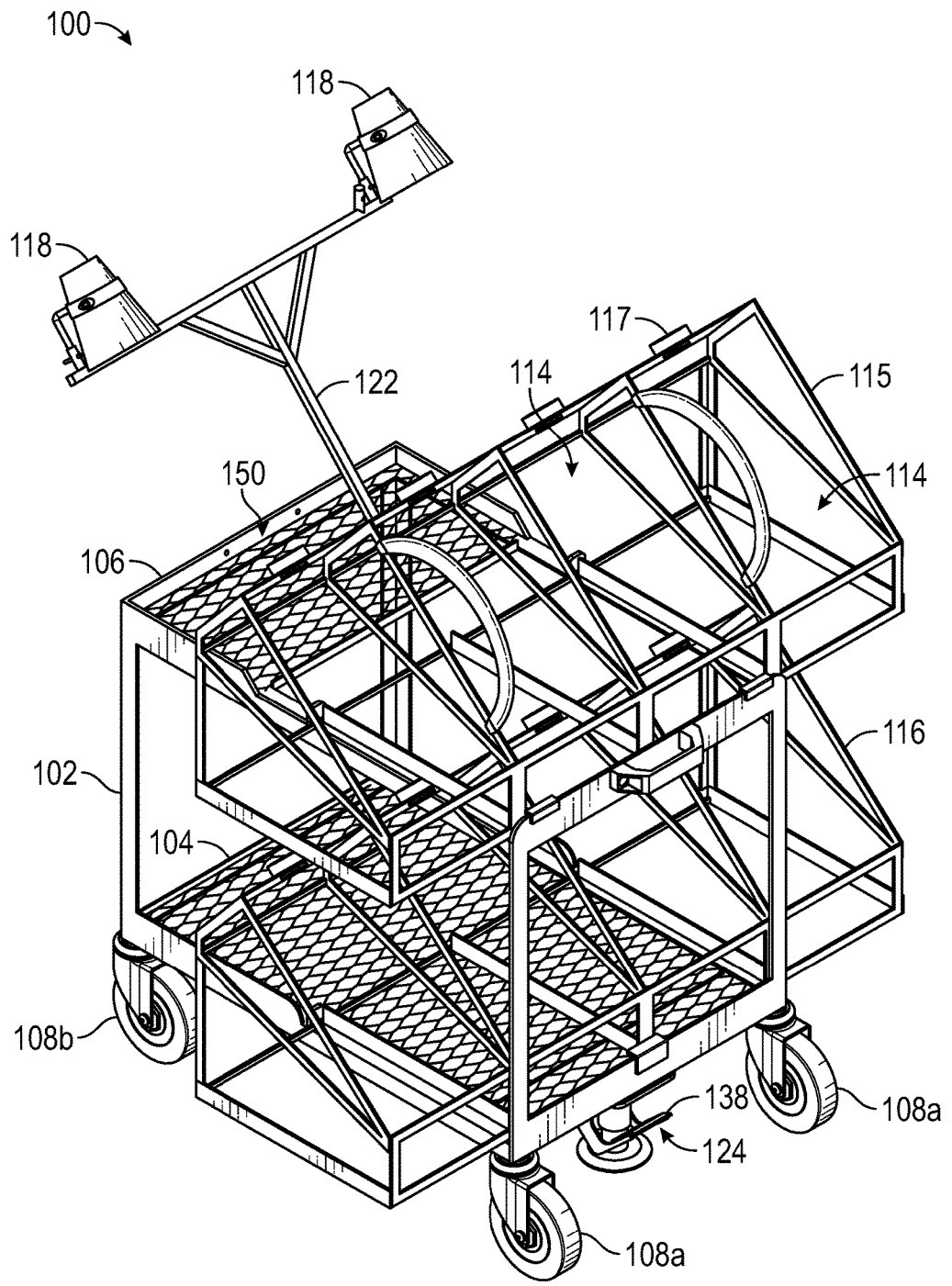
FIG. 4 is an isometric view of the back of the hand cart assembly shown in FIG. 1 in accordance with embodiments of the present invention.

In embodiments, the hand cart assembly 100 can further include one or more shelves 150 for storage of tools and/or additional cable containers, as shown in FIGS. 4 and 5. As will be appreciated, certain mesh surfaces of the hand cart assembly 100 have been removed in FIGS. 4 and 6 to allow a more clear depiction of the structure of the hard cart assembly 100. As seen in FIG. 5, in embodiments, the cart body 102 and the rack(s) 110, 116 of the hand cart assembly 100 may be substantially comprised of wire mesh surfaces.

FIG. 10 illustrates a fully loaded hand cart 100 configured with upper and lower racks 115, 116 of a 2-bin variety. The upper rack 115 is loaded with a cable bag and a standard reel-in-box, while two cable bag wire containers 114 are loaded on the lower rack 116. Each of these four wire containers 114 are feeding wire through payout slots 117 in the bins and into the dispensing cone 118 of the upper rack 115. From there, the wire may be pulled in multiple directions as needed. Provided the foot brake assembly 124 is engaged, the cart 110 will rotate freely in the direction of installation. In addition, wire reels have been loaded on the front of the cart, and mounted on a rod 162 fitted through holes 164 in the cart body 102. While wire could be installed and paid out from these reels, this is primarily used for storage of spare wire reels of wire awaiting loading into a box and bin 114. In all, the wire cart can support up to two thousand pounds of wire and equipment and function as described above.

Accordingly, it has been described how the present invention provides versatility, flexibility and vast improvement over the prior art. In addition to its various configurations, it works to reduce line friction and increase the effective working distance for the installers, while reducing or eliminating the need to reposition the cart or change out wire containers by sliding them on and off a support rod. It will be understood by those skilled in the art that various changes may be made and equivalents may be substituted without departing from the scope of the novel and non-obvious techniques disclosed in this application. Therefore, it is intended that the novel teachings of the present invention not be limited to the particular embodiment disclosed, but that they will include all embodiments falling within the scope of the appended claims.

What is claimed is:
1. A cart for dispensing wire comprising:
 a cart body extending vertically between a bottom portion and a top portion;
 a plurality of wheels connected to the bottom portion of the cart body by way of a rotatable caster;
 at least a first rack supported by the cart body, the first rack configured to house a first plurality of wire containers;
 a dispensing cone having first and second openings through which wire extending from one or more of the first plurality of wire containers is routed; and
 a brake assembly connected to the bottom portion of the cart body, the brake assembly having an engaged configuration in which the brake assembly extends to a floor surface and engages the surface to prevent the cart from changing location, and a disengaged configuration in which the brake assembly is suspended above the floor surface without contacting the surface allowing the cart to move freely,
 wherein the brake assembly comprises a swivel portion having a top plate that remains fixed to an underside of the bottom portion of the cart body, and a bottom plate that is rotatable relative to the bottom portion of the cart body while remaining fixed relative to the floor surface when the brake assembly is in the engaged configuration.

2. The cart of claim 1, wherein the first rack is supported by the top portion of the cart body and comprises a stanchion for supporting the dispensing cone is a position offset from the wire containers.

3. The cart of claim 2, further comprising a second rack, the second rack supported by the bottom portion of the cart body and configured to house a second plurality of wire containers.

4. The cart of claim 3, wherein wire extending from at least one of the second plurality of wire containers is routed through an opening in the top portion of the cart body and through the first and second openings of the dispensing cone alongside the wire extending from one or more of the first plurality of wire containers.

5. The cart of claim 3, further comprising a mounting rod extending across the bottom portion of the cart for use in mounting wire reels.

6. The cart of claim 1, wherein the brake assembly is connected to the bottom portion of the cart body at a point substantially centered between two of the plurality of wheels and is positioned to suspend those two wheels above the floor surface when in the engaged configuration.

7. The cart of claim 6, wherein at least a third wheel from among the plurality of wheels remains in contact with the floor surface when the brake assembly is in the engaged configuration, and wherein the third wheel operates to roll in a circular path around the brake assembly when the wire is pulled at an angle relative to the first and second openings of the dispensing cone.

8. The cart of claim 1, wherein the first rack is configured to simultaneously contain cable bag containers and reel-in-box containers as wire is simultaneously being pulled out from each such container and through the dispensing cone.

9. The cart of claim 1, wherein the brake assembly further comprises a foot pedal for maneuvering the brake assembly from the disengaged to the engaged position.

10. The cart of claim 1, wherein the top plate is configured to rotate a continuous 360 degrees relative to the bottom plate.

11. A wire dispensing system comprising:
a cart body having a plurality of wheels connected to a bottom portion by way of a rotatable caster, the bottom portion comprising a brake assembly movable between an engaged configuration at which at least two of the plurality of wheels are suspended above a floor surface on which the cart body rests, and a disengaged configuration at which the brake assembly is suspended above the floor surface by the plurality of wheels;
at least a first rack attached to a top portion of the cart body, the first rack having a plurality of first bins, each first bin comprising a payout slot for wire;
a plurality of wire containers, each wire container placed in a separate one of the plurality of first bins; and
a wire dispensing cone having first and second openings through which wire extending from the plurality of wire containers is routed,
wherein the brake assembly comprises a swivel portion having a top plate that remains fixed to an underside of the bottom portion of the cart body, and a bottom plate that is rotatable relative to the bottom portion of the cart body while remaining fixed relative to the floor surface when the brake assembly is in the engaged configuration.

12. The wire dispensing system of claim 11, further comprising a stanchion for positioning the wire dispensing cone in a fixed location relative to the first bins and away from the wire containers therein.

13. The wire dispensing system of claim 11, wherein the wire dispensing cone and the payout slots are formed of a non-abrasive plastic material to reduce friction with wire as it is paid out of the wire containers.

14. The wire dispensing system of claim 11, further comprising a second rack attached to a bottom portion of the cart body, the second rack having a plurality of second bins, each second bin comprising a payout slot for wire.

15. The wire dispensing system of claim 14, further comprising a second plurality of wire containers, each wire container from the second plurality placed in a separate one of the plurality of second bins.

16. The wire dispensing system of claim 15, wherein wire extending from at least one of the second plurality of wire containers is routed through an opening in the upper portion of the cart body and through the dispensing cone alongside the wire extending from the wire containers placed in a separate one of the plurality of first bins.

17. The wire dispensing system of claim 11, wherein the plurality of wire containers comprises a reel-in-box container and a cable bag container, each of which can payout wire simultaneously when pulled through the dispensing cone by an operator.

18. The wire dispensing system of claim 11, wherein, when the brake assembly is in the engaged configuration and when the wire extending from the plurality of wire containers through the wire dispensing cone is pulled at an angle to the first and second openings with sufficient force, the cart body rotates about the swivel portion of the brake assembly in the direction of the pull.

* * * * *